(12) United States Patent
Legallais et al.

(10) Patent No.: US 9,635,082 B2
(45) Date of Patent: Apr. 25, 2017

(54) METHOD OF SAVING CONTENT TO A FILE ON A SERVER AND CORRESPONDING DEVICE

(71) Applicant: THOMSON LICENSING, Issy de Moulineaux (FR)

(72) Inventors: Yvon Legallais, Rennes (FR); Anthony Laurent, Vignoc (FR); Christopher Howson, Corps-Nuds (FR); Gilles Straub, Acigne (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 273 days.

(21) Appl. No.: 14/346,809

(22) PCT Filed: Sep. 25, 2012

(86) PCT No.: PCT/EP2012/068890
§ 371 (c)(1),
(2) Date: Mar. 24, 2014

(87) PCT Pub. No.: WO2013/045456
PCT Pub. Date: Apr. 4, 2013

(65) Prior Publication Data
US 2014/0237086 A1    Aug. 21, 2014

(30) Foreign Application Priority Data
Sep. 27, 2011 (FR) ...................... 11 58633

(51) Int. Cl.
*G06F 15/16* (2006.01)
*H04L 29/06* (2006.01)
(Continued)

(52) U.S. Cl.
CPC ........ *H04L 65/601* (2013.01); *H04L 12/2805* (2013.01); *H04N 21/21805* (2013.01);
(Continued)

(58) Field of Classification Search
CPC ............... H04L 65/601; H04L 12/2805; H04L 2012/2849; H04N 21/21805;
(Continued)

(56) References Cited

U.S. PATENT DOCUMENTS

2005/0038794 A1* 2/2005 Piersol ................. G11B 27/105
2005/0204065 A1    9/2005 Son et al.
(Continued)

FOREIGN PATENT DOCUMENTS

KR        1046182       7/2011
WO   WO2009077544      6/2009

OTHER PUBLICATIONS

Bjelica et al., "Towards Ubiquitous Distributed Multimedia: UPnP-Based Control and Scripting", 5th European Conference on Circuits and Systems for Communications, belgrade, Serbia, Nov. 23-25, 2010, pp. 39-42.
(Continued)

*Primary Examiner* — June Sison
*Assistant Examiner* — Steven Nguyen
(74) *Attorney, Agent, or Firm* — Brian J. Dorini; Catherine A. Cooper

(57) ABSTRACT

The invention relates to a method and a device for converting a data stream transporting content into a file on a server, the content including timestamps for its playback, the timestamps indicating the time elapsed since the start of said content, the method being wherein it includes steps for receiving, from a broadcast channel, streaming content, calculating at least one piece of temporal playback information from at least one of the timestamps and a reference clock, the reference clock being the time reference for a local area network, saving the content to a file on a server, the server file being accessible by a playback terminal connected to the local area network, and saving a piece of
(Continued)

temporal playback information to a server file or to a description file associated with the server file.

29 Claims, 3 Drawing Sheets

(51) Int. Cl.

| | | |
|---|---|---|
| *H04N 21/218* | (2011.01) | |
| *H04N 21/262* | (2011.01) | |
| *H04N 21/43* | (2011.01) | |
| *H04N 21/433* | (2011.01) | |
| *H04N 21/436* | (2011.01) | |
| *H04L 12/28* | (2006.01) | |

(52) U.S. Cl.
CPC ..... *H04N 21/2625* (2013.01); *H04N 21/4307* (2013.01); *H04N 21/4334* (2013.01); *H04N 21/43615* (2013.01); *H04L 2012/2849* (2013.01)

(58) Field of Classification Search
CPC .......... H04N 21/2625; H04N 21/4307; H04N 21/4334; H04N 21/43615
See application file for complete search history.

(56) References Cited

U.S. PATENT DOCUMENTS

| | | | |
|---|---|---|---|
| 2007/0110074 A1 | 5/2007 | Bradley et al. | |
| 2007/0260634 A1* | 11/2007 | Makela | G11B 27/105 |
| 2008/0250101 A1 | 10/2008 | Tanaka et al. | |
| 2009/0238541 A1* | 9/2009 | Verna | H04N 21/4147 |
| | | | 386/338 |
| 2010/0208082 A1* | 8/2010 | Buchner | H04H 20/18 |
| | | | 348/207.1 |
| 2011/0075990 A1* | 3/2011 | Eyer | H04N 5/76 |
| | | | 386/241 |
| 2012/0106916 A1* | 5/2012 | Jumpertz | H04N 5/76 |
| | | | 386/230 |
| 2012/0219019 A1 | 8/2012 | Hirsch | |

OTHER PUBLICATIONS

Lohmar et al : "Dynamic Adaptive HTTP Streaming of live content", World of Wireless, Mobile and Multimedia Networks (WOWMOM), 2011 IEEE International Symposium on A, IEEE, Jun. 20, 2011, pp. 1-8.
John Ritchie etal . "UPnP AV Architecture : 2 for UPnP version 1.0", Dec. 31, 2010, Extrait de l'Internet : URL : http://upnp.org/specs/av/UPnP-av-AVArchitecture-v2.pdf; pp. 1-35.
Howson et al : "Second screen TV synchronization", Consumer Electronics—Berlin (ICCE-Berlin), 2011 IEEE International Conference on, IEEE, Sep. 6, 2011, pp. 361-365.
Waqar Zia : "DASH Evaluation Experiment 5 : Delivery Format of MPEG-2 TS", 94. MPEG Meeting ; Oct. 11, 2010-Oct. 15, 2010, Oct. 28, 2010; pp. 1-30.
Anonymous : "Digital Video Broadcasting (DVB) ; Specification for the carriage of synchronized auxiliary data in DVB transport streams European Broadcasting Union Européenne de Radio-Television EBUÜER ; ETSI TS 102 823", IEEE, vol. BC, No. V1.1.1, Nov. 1, 2005,pp. 1-38.
Keith Miller et al : "AVTransport : 3 Service for UPnP version 1.0", Dec. 31, 2010, Extrait de l'Internet : URL : http://upnp.org/specs/av/UPnP-av-AVTransport-v3-Service.pdf; pp. 1-138.
Search Report Dated Nov. 6, 2012.
ETSI TS 102 905 "DVB; technical specification for DVB services in the home network phase 1", Technical specification european telecommunications standards institute (ETSI), vol. Broadcast, No. V1.1.1, May 1, 2010.

* cited by examiner

METHOD OF SAVING CONTENT TO A FILE ON A SERVER AND CORRESPONDING DEVICE

This application claims the benefit, under 35 U.S.C. §365 of International Application PCT/EP2012/068890, filed Sep. 25, 2012, which was published in accordance with PCT Article 21(2) on Apr. 4, 2013 in English and which claims the benefit of French patent application No. 1158633, filed Sep. 27, 2011.

TECHNICAL DOMAIN OF THE INVENTION

This invention relates to the domain of content distribution in general and more specifically to the availability of streamed content on a server in a local area network.

TECHNOLOGICAL BACKGROUND OF THE INVENTION

Current local area networks allow various equipment to be interconnected, such as computers, data storage devices, audio and/or video playback devices, data receiver devices, printers, routers, landline and mobile telephones, personal assistants, and communications interfaces. This ability to interconnect nearby equipment and to implement sometimes complementary functions produces a growing need for interoperability between equipment connected to the same network.

Interoperability allows equipment to communicate with other equipment and to make functionality available to a user while ensuring simplicity of implementation. For example, it is convenient to be able to connect a printer to a local area network and to be able to print a document from a computer that is connected to the same network without having to first configure a set of parameters used for printing. To do this, there are interoperability standards that, implemented, allow equipment to automatically be detected after being connected to a network and to communicate its characteristics to other equipment, such as its make, model, main function, capacity, or even services that can be implemented through it.

One interoperability standard is UPnP ("universal plug and play", UPnP is defined by a set of documents available at http://upnp.org/). UPnP is a standard whose purpose is to allow equipment to easily connect to a local area network and to simplify its implementation on the network. UPnP-compatible equipment also supports file sharing, communication, and data interchange for utilities and entertainment applications. UPnP enables the interoperability of equipment with greater simplicity for the user by defining and publishing UPnP control protocols based on the usual communication standards for networks. UPnP AV is the part of the standard dealing with audio and video aspects. The current version of UPnP AV is UPnP AV:4.

With UPnP, it is possible to see from a computer, for example, files stored on a storage space on remote equipment that has been connected to the same local area network as the computer, without having to configure either piece of equipment. Similarly, it is possible to begin playback of audio/video content stored in a file saved on a storage space of a remote device, such as a hard drive, from a playback device, such as a television that is compatible with the content format, as long as both pieces of equipment were connected to the same local area network without any other configuration.

In the case wherein separate files, stored on a hard drive, contain separate components with the same audiovisual content, for example, UPnP can synchronize their respective playback on one or more playback devices. The same content can be a television program, and the components can be the audio and video or the videos corresponding to two different views of the same scene. Synchronization is possible if the components each contain temporal information related to their playback and the pieces of equipment share a common clock. Sharing a common clock applies to equipment connected to the same local area network. The common clock for a local area network is commonly called a "wall clock".

Methods for saving content allow that content to be played back from one or more files stored on a local server, the playback being specified, for example, according to a UPnP standard. However, these methods have the disadvantage of not allowing access to streamed content, such as audiovisual content transmitted by DTT (Digital Terrestrial Television), by satellite, or even multicasted on a broadband network.

GENERAL DESCRIPTION OF THE INVENTION

This invention resolves at least one of the drawbacks of the prior art. Specifically, it aims to allow a data stream to be saved to a server, the saving being adapted to content playback, comprising playback of a content synchronized with another content playback, for example, according to the UPnP AV:4 standards.

More specifically, the invention relates to a method for saving content to a server that is connected to a local area network, the server being adapted to the synchronized playback of audiovisual content by one or more playback devices connected to the local area network and by the use of an interoperability protocol between the server and the playback device(s).

The method comprises the steps of:
  receiving, from a broadcast channel, by a piece of equipment that is connected to the local area network, transmitted content, the transmitted content including timestamps, the timestamps indicating the time elapsed since the start of the content,
  calculating at least one piece of temporal playback information for synchronized playback by a playback device that is connected to the local area network, from at least one of the timestamps and a wall clock for the local area network,
  saving at least a portion of the content to the server of said local area network,
  saving at least one piece of temporal playback information to the local area network server, so that it is possible to synchronize the playback of the broadcasted content, received from a broadcast channel, with another content playback, both playbacks being achieved by equipment connected to the local area network.

According to one embodiment of the invention, the method further includes a playback step whose start time depends on temporal playback information.

According to one embodiment of the invention, the playback step cannot begin before a time specified by the temporal playback information, the content being unavailable before the specified time.

According to one embodiment of the invention, the playback step begins at a time specified by the temporal playback information.

According to one embodiment of the invention, the playback step includes a step for transmitting the file to at least one destination at a time specified by the temporal playback information.

According to one embodiment of the invention, the playback step includes a step for transmitting the file to at least one destination upon receipt of a request to transmit at least a portion of the content.

According to one embodiment of the invention, the step for calculating temporal playback information depends on the amount of space available for saving content.

According to one embodiment of the invention, the step for saving at least a portion of the content to a file uses a buffer file according to a circular buffer method.

According to one embodiment of the invention, the server file contains all of the content after it is received.

According to one embodiment of the invention, the broadcast channel is a bidirectional broadband channel.

According to one embodiment of the invention, the server is a local media server that is compatible with the Universal Plug and Play AV interoperability standard.

According to one embodiment of the invention, the temporal playback information is written to a content description service information field indicating a scheduled start time parameter (ScheduledStartTime).

According to one embodiment of the invention, the temporal playback information can be accessed by equipment connected to the server in a content description service.

The invention also relates to a device for saving content to a file. The device includes an input interface to receive transmitted content that includes timestamps, the timestamps indicating the time elapsed since the start of the content; a module for calculating at least temporal playback information from at least one timestamp and a wall clock, the wall clock being a local area network time reference; and a module for saving that can save transmitted content to a file and save temporal playback information.

According to one embodiment of the invention, the device includes a playback module that can play the file, based on the temporal playback information. The playback of the file can then be synchronized with the playback of another content (or another view of the same content). Advantageously, the device includes a module for saving the at least one piece of temporal playback information to a content description service information field indicating a scheduled start time parameter.

According to one embodiment of the invention, the device includes an interface for transmitting content at a moment based on the temporal playback information.

BRIEF DESCRIPTION OF THE FIGURES

The invention will be better understood and illustrated by means of the following embodiments and implementations, by no means limiting, with reference to the figures attached in the appendix, wherein:

In FIGS. 1 to 3, the modules shown are functional units that may or may not correspond to physically distinguishable units. For example, these modules or some of them can be grouped together in a single component, or constitute functions of the same software. On the contrary, some modules may be composed of separate physical entities.

DESCRIPTION OF A PREFERRED EMBODIMENT OF THE INVENTION

The embodiment falls within the scope of a home local area network connected to a wide area network by means of a network gateway, but the invention is not limited to this particular environment and can be applied within other environments.

Figure 1:
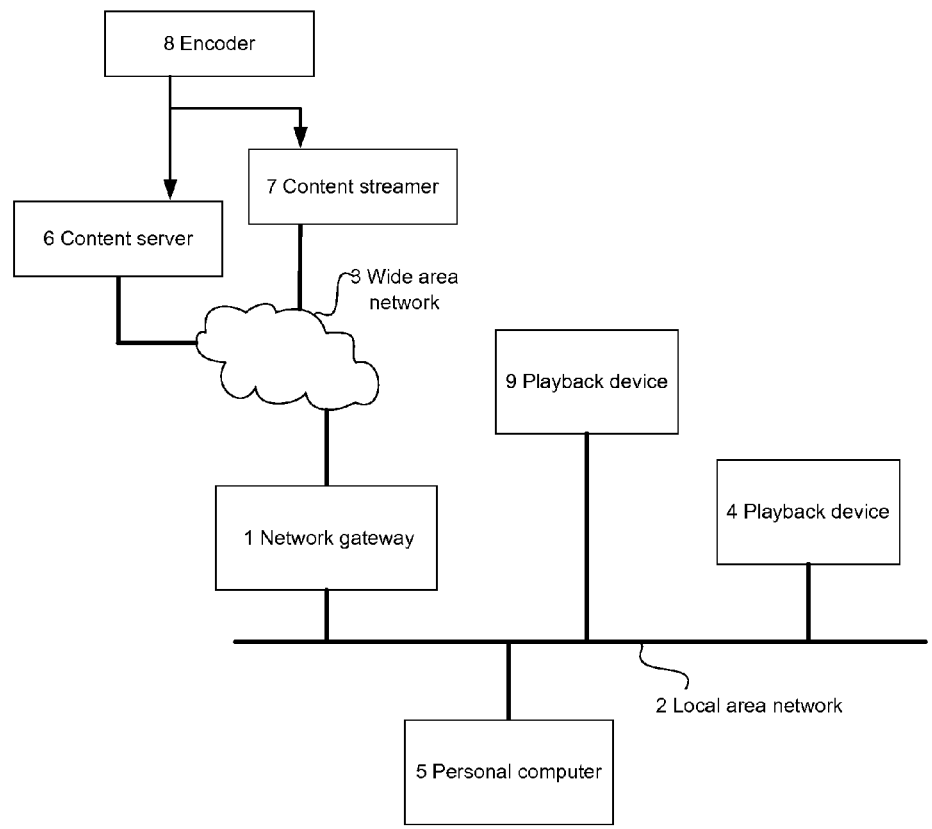
FIG. 1 is a block diagram of a home local area network connected to a wide area network by means of a network gateway, according to one embodiment of the invention.

FIG. 1 shows a home local area network 2 connected to a wide area network 3, by means of a network gateway 1. The wide area network 3 is a bidirectional broadband network, commonly known as the Internet. The home local area network is an Ethernet (ISO/IEC 8802-3) network according to the embodiment of the invention that is well known to those skilled in the art and includes wired connections. According to another embodiment, the local area network contains wireless connections, such as those described in the wireless transmission standards IEEE802.11. Various equipment is connected to the home local area network 2. This equipment includes the network gateway 1, a personal computer 5, and two playback devices 9 and 4. The playback devices 9 and 4 are televisions, each with an Ethernet network connection interface for receiving a digital stream carrying audiovisual content and playing it back in the form of playing a video or sound.

The network gateway 1 includes a modem and a router for connecting the home local area network 2 to the Internet and for accessing the Internet and related services such as telephony, the television, and video on-demand for the subscriber, a user of the home local area network 2.

A content streamer 7 is also connected to the wide area network 3 and streams audiovisual content that has been encoded by the encoder 8 on the wide area network 3. Audiovisual content is streamed according to a mode of multicast transmission. Also, a receiver device that can receive a multicast data stream can subscribe to a multicast stream transmitted by the content streamer 7. Such a device can be, for example, the personal computer 5 or the network gateway 1.

A content server 6 is also connected to the wide area network 3. The content server provides access, through the wide area network 3, to audiovisual content files encoded by the encoder 8. The personal computer 5 connected to the home local area network 2 can download a file and save it to a storage unit on the local network 2.

It is therefore possible, for a device connected to the home local area network 2, to receive a multicast data stream transporting audiovisual content streamed by the content streamer 7 and to download audiovisual content in the form of a file from the content server 6 for the purposes of saving it to a storage unit that is connected to the home local area network 2.

The audiovisual content is thus available in the form of files and can include common temporal information since the content was encoded by the encoder 8, regardless of whether it is stored on the content server 6 or streamed by the content streamer 7.

Figure 2:
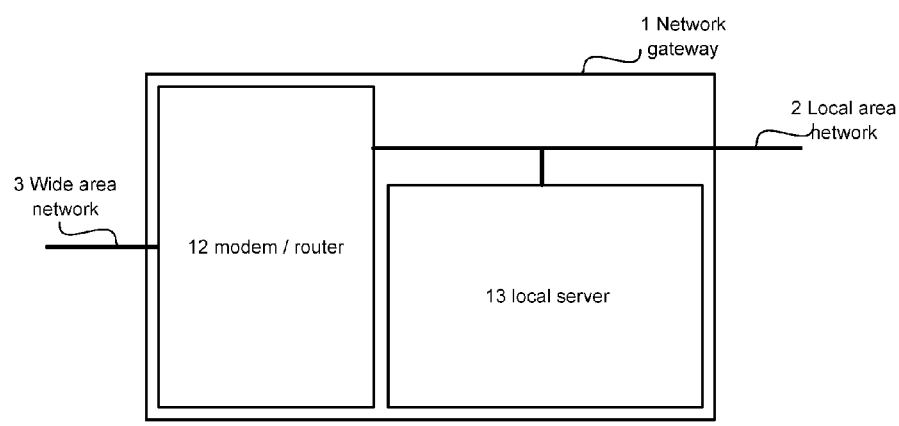
FIG. 2 illustrates a network gateway that includes a media server according to one embodiment of the invention.

FIG. 2 shows the overall architecture of the network gateway 1 according to one embodiment of the invention. The network gateway 1 includes a modem/router 12 for connecting the local area network 2 and the wide area network 3. The gateway 1 further includes a local server 13 that is connected to the local area network 2. The local server 13 is compatible with the UPnP AV:4 interoperability standard and allows files to be stored and accessed from equipment that is connected to the home local area network 2. It is therefore possible to share content files on the local server 13.

The system architecture that is shown allows sites that are accessible over the Internet, represented by the wide area network 3, to be viewed from a personal computer 5 that is connected to the home local area network 2. It is then possible to access the content server 6 connected to the wide area network 3 from the personal computer 5. Therefore, a user of the personal computer can download files that are available on the content server 6 to the personal computer 5 and save the downloaded files to the local server 13 for gateway 1. The local server 13 includes a saving unit shown in FIG. 2 that is accessible from the home local area network 3.

Figure 3:
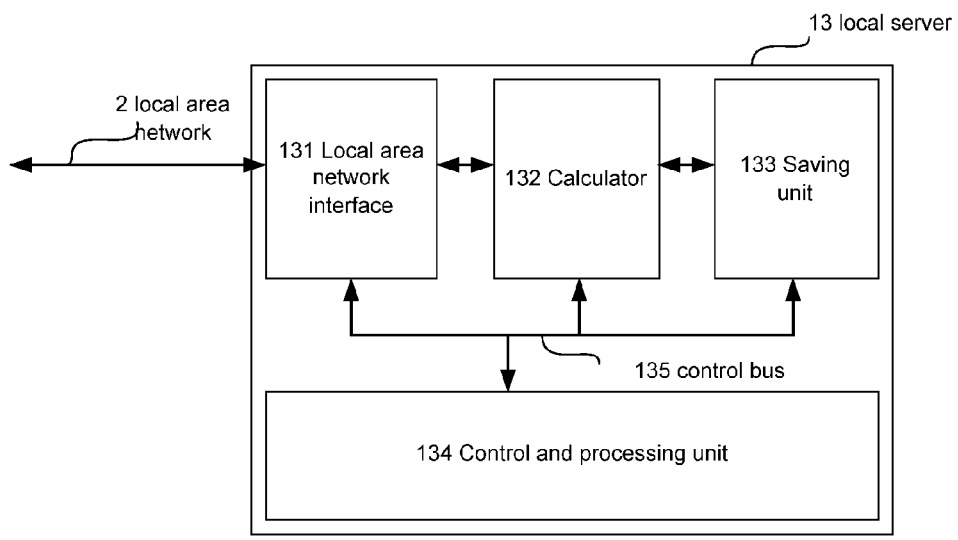
FIG. 3 illustrates the media server for the network gateway according to one embodiment of the invention.

FIG. 3 illustrates the local server 13 for the network gateway 1.

The local server 13 includes an interface for connecting to a local area network 131 for the connection to the home local area network 2. The local server also includes a calculator 132 that is connected to the interface 131 and a saving unit 133 that is connected to the calculator. The interface 131 is a bidirectional interface that can send and receive data to and from the saving unit 133 through the calculator 132. All of the management operations, control operations, and configurations to the network interface 131, the calculator 132, and the saving unit 133 are performed by the control and processing unit 134 by means of the control bus 135.

The control and processing unit 134 includes a microcontroller and related memory (not shown) that execute routines used for implementing functions on the local server 13. The saving unit 133 includes a hard drive and a hard disk controller that can be configured by the control unit 134.

The control unit 134 implements the services and functions specified by the UPnP AV:4 interoperability standard. The local server 13 is compatible with the UPnP AV:4 specifications and is seen as a Media Server, as defined by the specifications and all of the protocols described in UPnP AV:4.

Depending on the embodiment of the invention, a client application executed by the personal computer 5 can detect multicast streams streamed by the content streamer 7 and prompt the user to have the local server 13 store a multicast stream in the form of a file containing audiovisual content. The stored file is available for a playback device that is connected to the local area network 2.

The UPnP AV:4 standard defines a Media Server, a Media Renderer, and a Control Point. According to UPnP, the Control Point communicates with the Media Servers using established protocols that allow them to identify files on the Media Server and access a Content Descriptor Service (CDS).

According to the UPnP AV:4 standard, a piece of equipment that implements the UPnP Control Point function connected to a local area network can therefore request for a piece of equipment implementing the UPnP Media Renderer function and connected to the same local area network to play audiovisual content from a file that is accessible on the network and stored on equipment implementing the UPnP Media Server function. The synchronous playback of both streams of audiovisual content under UPnP is carried out by a SyncPlay function. The model for UPnP interaction between compatible equipment is such that the Control Point interacts with the Media Server(s) and the appropriate Media Renderer for playing back content. The Media Server and Media Renderer interact with one another directly via a protocol, depending on the type of local area network connecting them. The Control Point uses UPnP to initialize and configure the Media Server and the Media Renderer so that the content to be played back is transferred from one piece of equipment to the other. The SyncPlay function provides the Media Renderer with a presentation time for playing back content. This means that the Media Server and the Media Renderer share a wall clock, such as the reference clock for the home local area network 2.

Sharing a common clock among multiple pieces of equipment in a local area network is possible, for example, via the Network Time Protocol (NTP, described in the document RFC1305) for local and wide area networks. NTP is a protocol that makes it possible to use a network to synchronize the reference clock used by equipment connected to the network. This system for synchronizing equipment to a wall clock is based on a client/server principle.

Converting a multicast data stream transporting audiovisual content with timestamps indicating the time elapsed since the start of the content to be played back in a content file that is available on a UPnP AV:4 Media Server therefore makes it possible, depending on the embodiment of the invention, to play back on a piece of playback equipment that is connected to the local area network and implements the Media Renderer functions described in UPnP AV:4.

Converting the data stream in a file further allows synchronous playback with another component of audiovisual content that is available in another file on a UPnP AV:4 Media Server on the same local area network.

The example of multiple views of the same concert, filmed and recorded by different cameras and then encoded by the encoder 8 and stored partly on the content server 6 and partly, including a full view of the concert, on a streaming storage space 7 illustrates one of the advantages of the method. The server 6 makes audiovisual content available showing, for example, only a view of the pianist throughout the concert. The content streamer 7 has audiovisual content for a main view that shows all of the musicians during the concert. When the main view is multicasted, by a television operator, on the wide area network 3 and available to a local area network, such as the home local area network 2, converting the received multicast stream into a file available on a UPnP Media Server that is connected to the home local area network 2 allows for playback to be synchronized with the pianist view if it was previously downloaded from the content server 6 and made available on a UPnP AV:4 Media Server that is connected to the home local area network 2. This is possible when the main view that is multicasted (and whose content is "pushed" from the content streamer 7 to the network gateway 1 after the network gateway 1 has requested to be part of the multicast stream) includes a series of timestamps indicating the time elapsed since the start of the concert.

Depending on the embodiment of the invention, the client application executed by the personal computer 5 detects the multicast stream that is streamed from the content streamer 7 and displays the list of streams and the corresponding streamed content on the screen of the personal computer 5. The user of the client application can request to save a multicast stream in the form of a file from the UPnP AV:4 Media Server on the local server 13. The control and processing unit 134 receives configuration information from the client application executed by the personal computer 5.

The control and processing unit 134 configures the network interface 131 to receive and save a multicast data stream on the local server 13. The network gateway sends a request to subscribe to the stream using the IGMP routing protocol (Internet Group Management Protocol, defined as a standard in RFC 1112), and the multicast stream is then transmitted to the network interface 131 on the network gateway 1.

Depending on the embodiment of the invention, the audiovisual content from the multicast stream is transmitted by packets according to the Real-Time Transfer Protocol (RTP) on a User Datagram Protocol (UDP), which are common transmission protocols for transmitting audiovisual content over wide and local area networks. The usable data that encodes the audiovisual content uses a Motion Picture Expert Group (MPEG) data compression protocol. Timestamps, like those specified in the ETSI TS 102823 standard, are also transmitted at regular intervals in the stream corresponding to the audiovisual content, indicating the time elapsed since the start of the content for the purpose of its playback, referred to here at the Time Offset current value (TOc).

The local area network interface 131 receives the packets from the multicast stream and filters them in order to transfer only the packets carrying usable data (ex. audio and video components of the transmitted audiovisual content) and packets including timestamps (TOc) to the calculator 132.

Depending on the embodiment of the invention, the calculator 132 calculates, based on the reference time of the local area network 2 and a timestamp received in the multicast stream, indicating the current position relative to the start of the audiovisual content, temporal playback information in accordance with UPnP AV:4. This temporal playback information is an availability time for the playback, expressed in hours, minutes, seconds, and tenths of a second.

This temporal information is then read by the control unit 134 in a calculator 132 log and written to an information field for the CDS associated with the save file that stores the data corresponding to the audiovisual content on the saving unit 133 for the local server 13.

Figure 4:
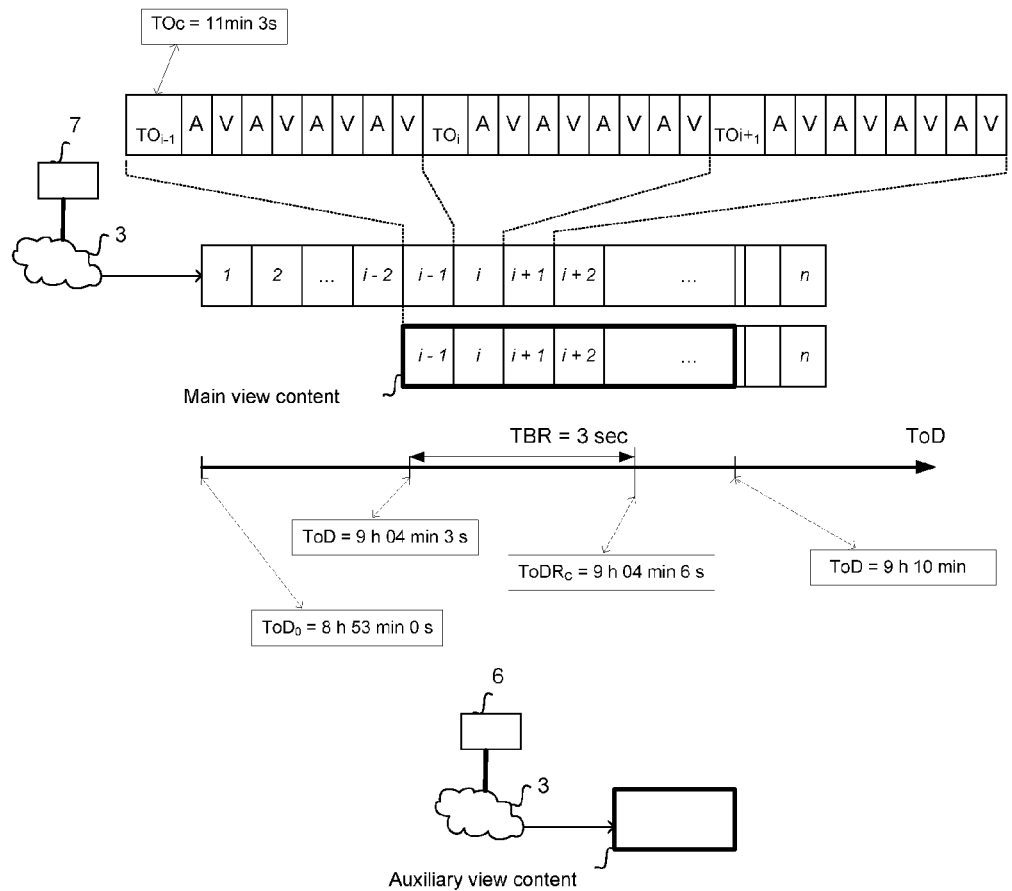
FIG. 4 temporally illustrates multicasted streamed content being received and a file being downloaded for synchronous playback.

FIG. 4 temporally illustrates multicasted streamed content being received and a file being downloaded for synchronized playback of its content. The multicast stream corresponds to the main view of the music concert transmitted from the streaming server 7. Receiving and reading the first timestamp TOc associated with the adjacent data encoding the corresponding audio and video for the view indicates that the concert started 11 minutes and 3 seconds ago. The reference time for the local network 2 (called "wall clock") is available to the calculator 132. It is transmitted to the calculator using, for example, the NTP protocol. When the first timestamp detected in the stream is read, the reference time (wall clock) for the home local area network is ToD=9hr 04min 3s. The calculator 132 for the local server 13 that receives the multicast stream calculates the start time of the content (in terms of playback) relative to the ToD reference time for the home local area network 2.

In other words, ToD0=ToD−TOc which corresponds to, for example:

ToD0=09 hr 04 min 03 s−11 min 03 s

ToD0=08 hr 53 min where ToD0 is the time when the start of the streamed content was received relative to the reference clock of the local area network 2, ToD.

Calculating ToD0 can accurately position the transmitted content in time, with reference to the clock for the home local area network 2 (the wall clock), since the content is encoded in a system without a common clock with the network 2. It is thereby possible to synchronize the playback of the content with the playback of one or more other pieces of content on a local server belonging to the home local area network 2 by defining an exact playback time.

The time from which a portion of received multicast stream can be played back, referenced relative to the reference time ToD of the local area network 2, must account for processing delays related to receiving, saving, controlling, reading, and transmitting it for playback. A maximum processing time TBR ("Time Before Rendering") is defined for all of these operations. Playback on equipment implementing the UPnP Media Renderer function can start from ToD+TBR.

The possible playback start time for the content whose component is pushed by the streaming server 7 and received by the local server 13 of the gateway 1 is ToDRc=ToD+TBR, referenced relative to clock for the local area network 2.

Depending on the embodiment of the invention, the control and processing unit 134 reads the ToDRc, TOc, and ToD0 information in the calculator 132 logs and writes the ToDRc value to the information field called ScheduleStartTime for the UPnP AV:4 content description service (CDS) that is available on the saving unit of the local server 13. This information field is meant to indicate the scheduled start time for playing back content.

According to another embodiment of the invention, the control and processing unit 134 reads the ToDRc, TOc, and ToD0 information in the calculator 132 logs and then calculates and writes a value corresponding to a time after ToDRc to the information field called ScheduleStartTime for the UPnP AV:4 content description service (CDS) in order to delay the start of playback based on other synchronization criteria.

The method therefore calculates temporal playback information (ex. ToDRc) from at least one timestamp (ex. TOc) and the reference clock for the home local area network 2, the reference clock being the local area network 2 time reference.

Temporal playback information, which can be ToDRc or a value corresponding to a later time, is saved to the information field for the content description service (CDS) indicating a scheduled start time (ScheduledStartTime).

If the file for the pianist view, available on the content server 6, is downloaded and stored on the saving unit 133 so that it is available for reading as of time ToD=9:10, for example, it is possible for a UPnP AV:4 Control Point to request the synchronized playback of the two views (the main view of the concert and the auxiliary pianist view) by executing SyncPlay commands using the UPnP AV:4 protocol. In one embodiment of the invention, the UPnP AV:4 Control Point is executed by the personal computer 5.

A first SyncPlay command tells, for example, the playback device 9, which implements the UPnP AV:4 Media Renderer functions, to play back the content of the corresponding file upon receipt of the multicast stream available on the UPnP AV:4 Media Server for the local server 13 at the time whereby ToDRc=ToD+TBR. The SyncPlay command provides a parameter that indicates the location of the file on the network, along with the exact time to start playback and a position reference parameter.

A second SyncPlay comment tells the playback device 4, for example, to play back the content of the file for the pianist view, which was previously downloaded onto the UPnP AV:4 Media Server from the local server 13, indicating a playback start time calculated by the Control Point from the calculated start time for the main view and the TBR processing time.

The UPnP AV:4 Control Point also tells the playback device 4 to locate the corresponding file. The playback device 4 that implements the UPnP AV:4 Media Renderer functions sends a request to transfer content to the UPnP AV:4 Media Server from the local server 13.

The UPnP AV:4 Media Server for the local server 13 transfers the contents of the file to the UPnP AV:4 Media Renderer (the playback device 4), which plays back the contents synchronously with the other UPnP AV :4 Media Renderer (the playback device 9), the temporal parameters sent by the SyncPlay comments referring to the clock for the home local area network 2 and calculated according to the same principle by the UPnP AV:4 Control Point.

Figure 5:
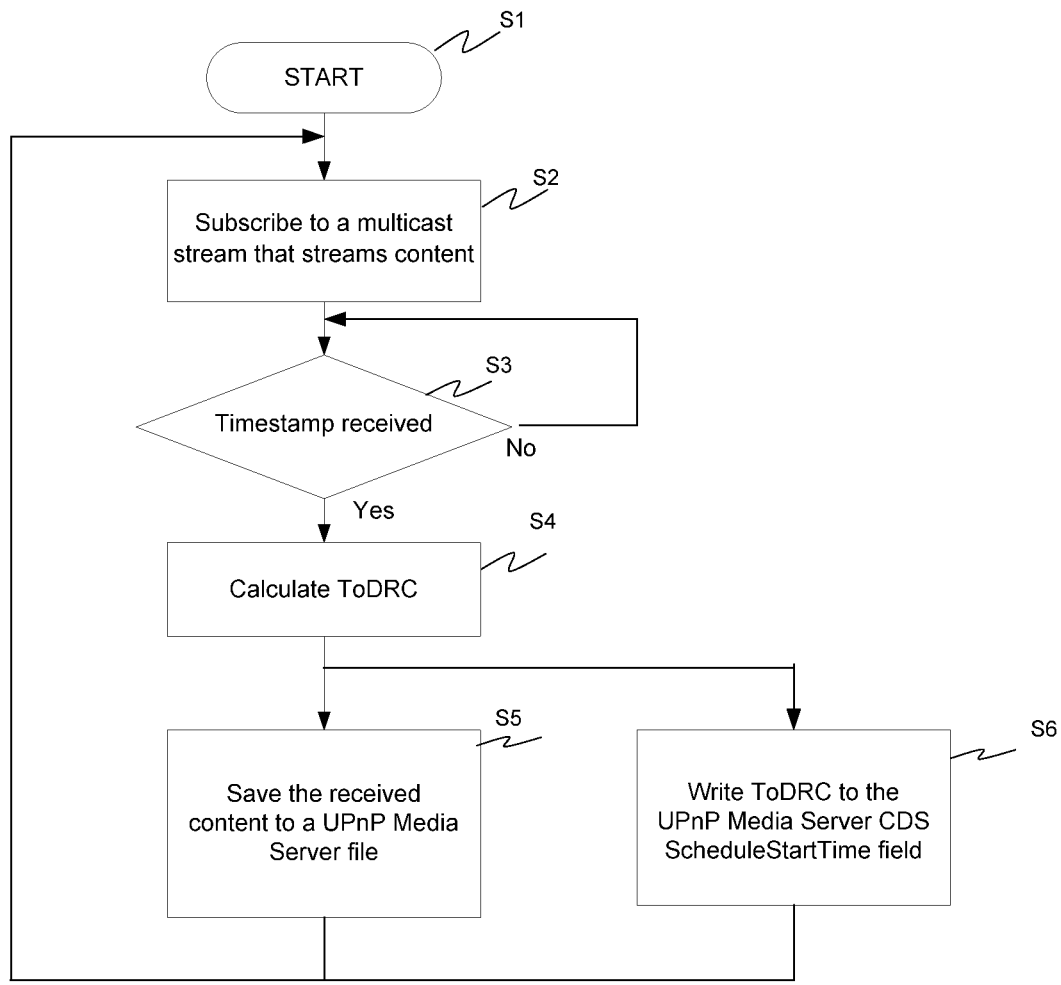
FIG. 5 is a diagram illustrating the steps of the method.

FIG. 5 is a block diagram that illustrates the method according to one embodiment of the invention. The step 51 is the starting step. The multicast stream is streamed by the content streamer 7 over the wide area network 3, but it is not routed to the network gateway 1.

In the step S2, a user of the personal computer on the home local area network 2 orders the multicast stream to be saved to the local server (UPnP Media Server) at the network gateway 1. A command is sent from the local computer 5 to the network gateway 1, which sends a subscription request to the multicast stream, using a routing protocol like IGMP.

In the step S3, the multicast stream is routed to the network gateway and received by the interface 131 with the local server 13. The calculator is configured to detect the first timestamp in the multicast stream, indicating the time elapsed since the start of the streamed content (the time is the time elapsed during playback).

In the step S4, the calculator detects and reads a timestamp and calculates the time difference between the current reference time for the home local area network 2 ToD (the "wall clock") and the value indicated by the TOc timestamp. The ToD0 time, when the start of the content would have been received if the gateway had been subscribed to the multicast flow prior to the start of the stream, is therefore known, and it is possible to locate all of the streamed content based on the reference time for the home local area network 2 (the "wall clock"). This time is called the content start time.

The calculator also updates a TBR log that indicates the total data processing time and conditions when the data can be begin to be presented for content playback.

In the step S5, the audiovisual content is saved to the storage space for the saving unit 133. The storage space can be a hard drive, flash memory, RAM, or any other media capable of saving audiovisual content. Depending on the variant, the storage space is included with the saving unit 133 or connected to the saving unit 133.

Content can be saved to a file containing the data since the start of receipt (from the subscription to the multicast stream) to the end of the content or until the end of receipt (end of the subscription to the multicast stream).

In another embodiment, saving can be done using a circular memory buffer technique, well known to those skilled in the art, that limits how much space is needed for saving. The content is then written to a file using a write pointer in circular memory, and playback is then positioned so that a read pointer used for playback follows the write pointer.

In the step S6, the calculator 132 uses at least some of ToD0, ToD, TOc, and TBR to determine the first point from which content should be played back by a playback device that is compatible with a Media Renderer, as described in the UPnP standard. This point, which can be expressed as a time, is written to the ScheduleStartTime field in the UPnP content descriptor, making it possible to give the content from the local server 13 to a device that is compatible with the Control Point, as defined in UPnP. In other words, the content playback start time is "forced" by writing the ScheduleStartTime field. The ScheduleStartTime field is initially set to indicate the start time for a program according to the UPnP standard.

A UPnP Control Point can read temporal playback information, in the form of a playback start time, in the ScheduleStartTime field for the CDS on the media server. If the Control Point sends a synchronized playback comment to a UPnP Media Renderer playback device, the method includes a synchronized playback step whose start time depends on the temporal playback information.

In another embodiment, the ToDRC value is calculated based on other temporal and non-temporal information. Calculating the ToDRC from the ToD (the wall clock) and the TOc (the first timestamp sent in the stream, indicating the time elapsed since the start of the content), along with the TBR processing time, determines the first moment when playback is possible.

It is possible to delay the start of playback by defining a later playback start time using criteria such as the subscriber's rights to services or viewing based on the content to be played back, for example. By forcing the playback time, it is possible to make audiovisual content unavailable for playback before a given time.

In another embodiment, the playback start time is calculated based on the available space on the saving unit for saving the content, considering that the data must be able to be stored without overflow and without disrupting the content playback. When using a file with the "circular buffer" method with consideration for the defined buffer file size, the playback start time happens before the circular buffer has filled with data from the multicast stream, for example.

The method allows audiovisual content, for example, sent by a broadcast channel, to be made accessible from a media server that is connected to a local area network, like other content available on the media server and coming from another source. The media server that is connected to the local area network is, for example, a media server as defined in the UPnP AV standard. Content that has been streamed and saved to a file on a media server can then be played back on a playback device that is connected to the network at any moment (or time), as defined according to various criteria. This can be from the time when the first content data was received, to which the necessary processing time is added between receipt and playback and referenced according to the clock for the local area network. It can also be a specific time.

A tip for the method is using an information field that tells a control device or playback device when the content can be played back. It is therefore possible to force this time for one or more playback devices.

This moment (this time) can be delayed based on other criteria to conditionalize or to synchronize the playback of content.

The method can force a time before which playback is not possible.

Of course, the invention is not limited to the examples described above. It also relates to variants.

According to variants of the embodiment, content is synchronously played back from temporal playback information (such as the information field ScheduleStartTime defined in the UPnP standard) by multiple playback devices.

In other variants, playback is initiated by separate control requests transmitted to each of the playback devices or by one control request transmitted to all or some of the playback devices connected to the home local area network (such as devices belonging to the same group (based on their type, for example)).

In some variants, the requests are unicast, multicast, or broadcast.

In variants of the embodiment, saving happens at the end of the transmitted audiovisual content or applies sequentially as content is streamed.

In variants of the embodiment, the media server that contains the save file and the playback device for playing back the content are included in a single piece of equipment or shared among multiple separate pieces of equipment.

In some variants, the file is fully or partially transmitted from the media server (Media Server) to one or more playback devices (Media Renderer). In one variant, the playback device is included on the same equipment as the media server.

Specifically, in one variant, the broadcast network is suitable for transmitting streamed contend by a general or targeted broadcast mode to one or more destinations.

In various embodiments, the content includes audio and/or video data and/or interactive data.

In various embodiments, the media server is a dedicated piece of equipment, or it is included in devices such as a network gateway, a television receiver/decoder, a computer, a television, a personal assistant, or a mobile phone.

In some variants, the media server is a dedicated device, or it is included in one or more devices.

In some variants, the timestamps are transmitted as a content component or in packet headers received via the broadcast channel, or in content in a form using the audio or video watermarking technique that is already known as watermarking or fingerprinting.

In various embodiments, the reference clock for the local area network is transmitted from a server on the wide area network to all of the equipment connected to the home local area network.

In variants, the media server is a local or remote server.

The invention also applies to any device that is connected to a network, contains a file server where the files contain one or more audio/video components, and whose component playback is synchronized relative to a network reference clock.

More generally, the invention applies to any device or system implementing the method described above, according to its variants.

The invention claimed is:

1. A method for saving content to a server that is connected to a local area network, the server being adapted to synchronize a playback of broadcast audiovisual content with another stored audiovisual content related to said broadcast audiovisual content, said broadcast audiovisual content being received by said server, said stored audiovisual content not being included in said received broadcast audiovisual content, said playback being synchronized on at least one playback device connected to said local area network and by the use of an interoperability protocol between said server and said at least one playback device, said method comprising:
receiving, from a broadcast channel, by a piece of equipment that is connected to said local area network, said broadcast audiovisual content, said broadcast audiovisual content including timestamps, said timestamps indicating the time elapsed since the start of said broadcast audiovisual content;
calculating at least one piece of temporal playback information for playback by said at least one playback device, from a common wall clock for said local area network and at least one of said timestamps, said common wall clock for said local area network being shared by said server and said at least one playback device;
saving at least a portion of said broadcast audiovisual content to said server of said local area network; and
saving said at least one piece of temporal playback information to said local area network server.

2. The method according to claim 1, wherein a start time of the playback depends on said at least one piece of temporal playback information.

3. The method according to claim 1, wherein the playback cannot begin before a time specified by said at least one piece of temporal playback information, said broadcast audiovisual content being unavailable before the specified time.

4. The method according to claim 1, wherein the playback begins at a time defined by said at least one piece of temporal playback information.

5. The method according to claim 1, wherein the playback further comprises transmitting said at least a portion of said broadcast audiovisual content to at least one destination at a time defined by said at least one piece of temporal playback information.

6. The method according to claim 1, wherein the playback further comprises transmitting said at least a portion of said broadcast audiovisual content to at least one destination after receiving a request to transmit said at least a portion of said broadcast audiovisual content.

7. The method according to claim 1, wherein calculating said at least one piece of temporal playback information depends on an amount of available space for saving at least a portion of said broadcast audiovisual content.

8. The method according to claim 1, wherein saving at least a portion of said broadcast audiovisual content to a file uses a buffer file according to a circular buffer method.

9. The method according to claim 1, wherein the server contains all of said broadcast audiovisual content after it is received.

10. The method according to claim 1, wherein said broadcast channel is a bidirectional broadband channel.

11. The method according to claim 1, wherein said server is a local media server that is compatible with the Universal Plug and Play AV interoperability standard.

12. The method according to claim 1, wherein said at least one piece of temporal playback information is written to a content description service information field indicating a scheduled start time parameter.

13. The method according to claim 1, wherein said at least one piece of temporal playback information can be accessed by equipment connected to said server in a content description service.

14. A device, comprising:
a processor executing instructions in communication with a memory storing the instructions to provide:
a network interface for connection to a local area network;
said processor including instructions to:
receive broadcast audiovisual content that includes timestamps, said timestamps indicating the time elapsed since the start of said broadcast audiovisual content, the received broadcast audiovisual content not including stored audiovisual content related to said broadcast audiovisual content;

calculate at least one piece of temporal playback information for playback by at least one playback device, using a common wall clock for said local area network and at least one of said timestamps, said common wall clock for said local area network being a local area network time reference and being shared by said device, and said at least one playback device;

save at least a portion of said broadcast audiovisual content and save said at least one piece of temporal playback information for synchronizing a playback on said at least one playback device of said broadcast audiovisual content with said stored audiovisual content related to said broadcast audiovisual content, said playback being synchronized on said at least one playback device connected to said local area network by use of an interoperability protocol between said device and said at least one playback device.

15. The device according to claim 14, wherein said processor further executes instructions in communication with the memory storing the instructions, to write the said at least one piece of temporal playback information to a content description service information field indicating a scheduled start time parameter.

16. The device according to claim 14, wherein said processor further executes instructions in communication with the memory storing the instructions to transmit said at least a portion of said broadcast audiovisual content based on said at least one piece of temporal playback information.

17. An apparatus comprising:

a processor executing instructions in communication with a memory storing the instructions to provide:

a server to save content to said server, said server connected to a local area network, the server being adapted to synchronize a playback of a broadcast audiovisual content with another stored audiovisual content related to said broadcast audiovisual content, said broadcast audiovisual content being received by said server, said stored audiovisual content not being included in said received broadcast audiovisual content, said playback being synchronized on at least one playback device connected to said local area network by the use of an interoperability protocol between said server and said at least one playback device;

said processor including instruction to:

receive, from a broadcast channel, by a networking device that is connected to said local area network, said broadcast audiovisual content, said broadcast audiovisual content including timestamps, said timestamps indicating the time elapsed since the start of said broadcast audiovisual content;

calculate at least one piece of temporal playback information for playback by said at least one playback device, from a common wall clock for said local area network and at least one of said timestamps, said common wall clock for said local area network being shared by said server and said at least one playback device;

save at least a portion of said broadcast audiovisual content to said server;

to save said at least one piece of temporal playback information to said server.

18. The apparatus according to claim 17, further comprising a start time of the playback depends on said at least one piece of temporal playback information.

19. The apparatus according to claim 17, wherein the playback cannot begin before a time specified by said at least one piece of temporal playback information, said broadcast audiovisual content being unavailable before the specified time.

20. The apparatus according to claim 17, wherein the playback begins at a time defined by said at least one piece of temporal playback information.

21. The apparatus according to claim 17, wherein the playback further comprises transmitting said at least a portion of said broadcast audiovisual content to at least one destination at a time defined by said at least one piece of temporal playback information.

22. The apparatus according to claim 17, wherein the playback further comprises transmitting said at least a portion of said broadcast audiovisual content to at least one destination after receiving a request to transmit said at least a portion of said broadcast audiovisual content.

23. The apparatus according to claim 17, wherein said calculation of said at least one piece of temporal playback information depends on an amount of available space for saving at least a portion of said broadcast audiovisual content.

24. The apparatus according to claim 17, wherein said saving of at least a portion of said broadcast audiovisual content to a file uses a buffer file according to a circular buffer method.

25. The apparatus according to claim 17, wherein the server contains all of said broadcast audiovisual content after it is received.

26. The apparatus according to claim 17, wherein said broadcast channel is a bidirectional broadband channel.

27. The apparatus according to claim 17, wherein said server is a local media server that is compatible with the Universal Plug and Play AV interoperability standard.

28. The apparatus according to claim 17, wherein said at least one piece of temporal playback information is written to a content description service information field indicating a scheduled start time parameter.

29. The apparatus according to claim 17, wherein said at least one piece of temporal playback information can be accessed by equipment connected to said server in a content description service.

* * * * *